May 21, 1946.　　　R. J. WOODS　　　2,400,799
AIRCRAFT
Filed Jan. 8, 1942　　　3 Sheets-Sheet 1

FIG. I.

INVENTOR
ROBERT J. WOODS
BY
Beau, Brooks, Buckley & Beau.
ATTORNEYS

May 21, 1946.   R. J. WOODS   2,400,799
AIRCRAFT
Filed Jan. 8, 1942   3 Sheets-Sheet 3

INVENTOR
ROBERT J. WOODS
BY
Bean, Brooks, Buckley & Bean
ATTORNEYS

Patented May 21, 1946

2,400,799

UNITED STATES PATENT OFFICE 2,400,799

AIRCRAFT

Robert J. Woods, Grand Island, N. Y., assignor to Bell Aircraft Corporation, Buffalo, N. Y.

Application January 8, 1942, Serial No. 426,064

6 Claims. (Cl. 170—135.6)

This invention relates to aircraft, and more particularly to improvements in devices for providing automatic synchronization of propeller operation in multi-engine-propeller type aircraft.

One of the objects of the invention is to provide a multiple engine-propeller installation including a plurality of separately mounted propeller driving engines and improved synchronizing means in connection therewith, whereby the engine elements of the installation are adapted to be automatically and accurately synchronized with respect to propeller speeds and power outputs in an improved manner. Another object of the invention is to provide a design for a synchronizing mechanism of the above stated features and advantages which is also of improved simplicity and structural form and wherein a plurality of identical parts are employed whereby advantages of parts standardization are attained and devices embodying the design may be manufactured in quantities by most economical shop production methods. Another object of the invention is to provide a multiple engine-propeller airplane having improved synchronizing means in connection therewith whereby the engine-propeller units thereof are normally automatically and accurately synchronized with respect to propeller speeds and power outputs in an improved manner, and whereby one or more of the engine-propeller units thereof may be disassociated with respect to the synchronizing mechanism while the remaining pair or other plurality of engine-propeller units continue to be automatically controlled to operate in synchronism in an improved manner. Another object of the invention is to provide a mechanism of the above stated character which is adapted to be automatically disconnected in an improved manner to accommodate malfunctioning of either of the controlled engine-propeller units and to be manually reinstated in operation in an improved manner. Other objects and advantages of the invention will appear from the specification hereinafter.

Figure 1:
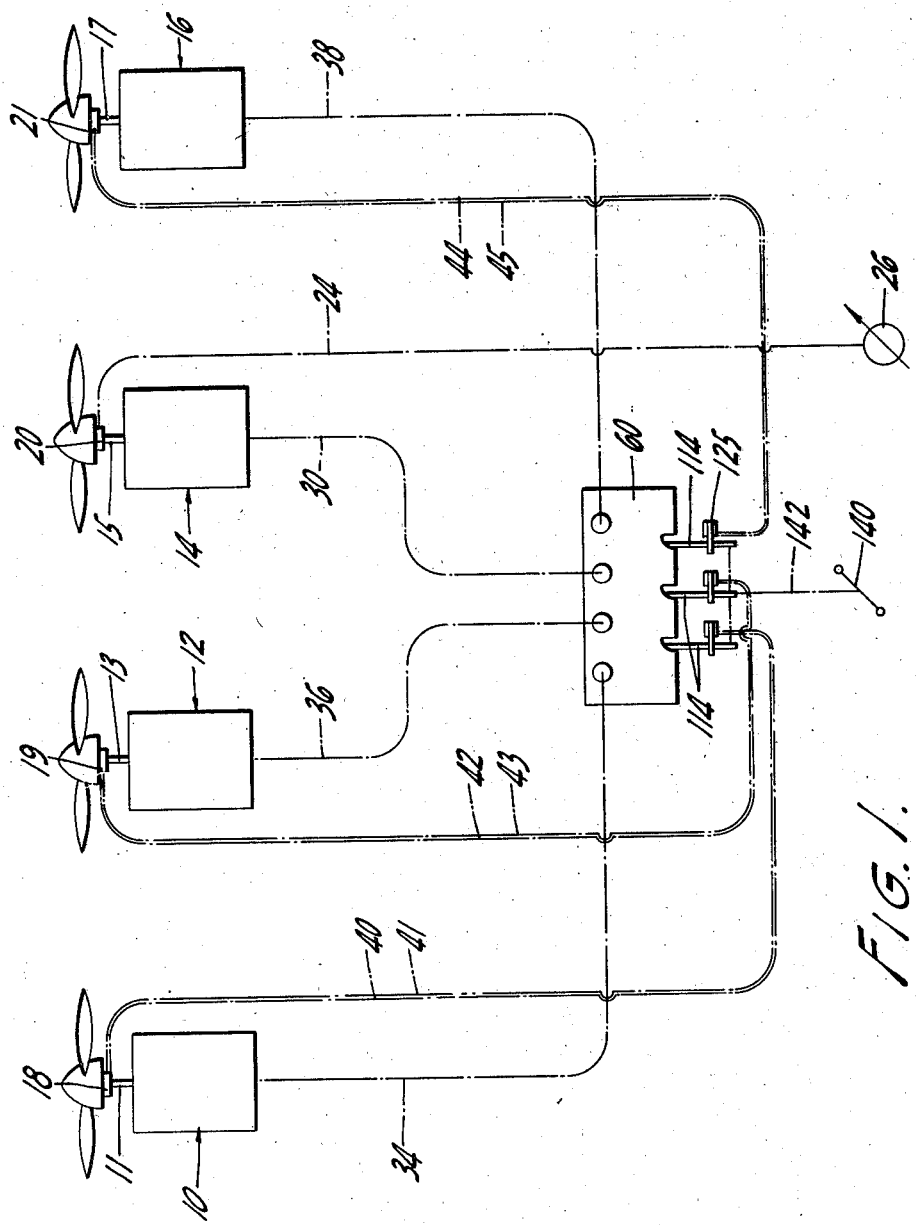
Fig. 1 is a diagrammatic illustration of an aircraft engine-propeller system having four separately mounted engine-propeller units arranged to be controlled by a synchronizing apparatus of the invention.

In the drawings the invention is illustrated in connection with an aircraft having four separately mounted engine-propeller units indicated generally at 10—12—14—16, respectively; and it will be seen that the propellers are mounted and operably connected to corresponding motors by means of shaft connections as indicated at 11—13—15—17 respectively.

Propeller pitch change devices are arranged upon each propeller drive shaft, as indicated at 18—19—20—21, so as to be adapted to alter the pitch or angle of attack of the blade portions of the propellers in response to controlled actuation thereof. In the case of the drawings the engine-propeller unit 14 is arranged to function as the master or lead unit of the battery, and the pitch change device 20 is arranged to be operably connected to a torque transmission cable 24 which is coupled to a manually adjustable control member 26 disposed within convenient reach of the aircraft pilot so as to be driven thereby for controlling propeller pitch adjustments and power output performances of all of the engine-propeller units of the aircraft, as will be explained more fully hereinafter. The engine 14 is also operatively coupled to a second torque transmission device 30 whereby upon operation of the motor 14 the cable 30 is driven to control synchronizing actuation of the engine-propeller units 10—12—16, as will also be explained more fully hereinafter.

The propeller pitch change devices 18—19—21 include reversible direction electric motors for adjusting the pitch change devices in exact synchronism with corresponding adjustments of the pitch change device 20 of the master motor unit 14. Torque transmission cables or like devices are arranged in operative connection with the corresponding engine-propeller units as indicated at 34—36—38; and the pitch control motors are arranged to be energized through electrical circuits including ground connections and corresponding paired conductors 40—41 and 42—43 and 44—45. It will of course be understood that the electrical circuits referred to will include any suitable power supply source (not shown).

Figure 2:
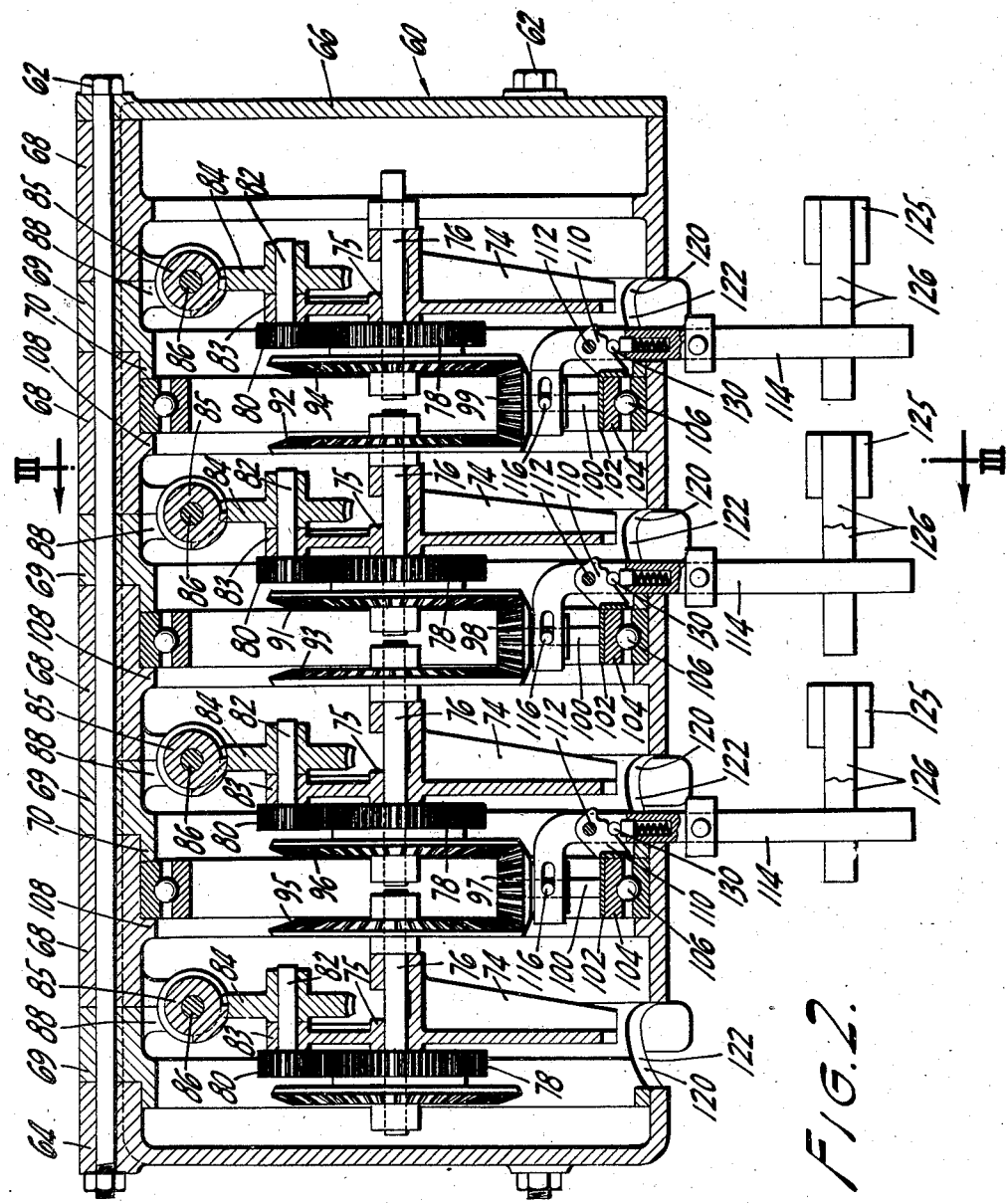
Fig. 2 is a longitudinal section through the synchronizing mechanisms of Fig. 1.
Figure 3:
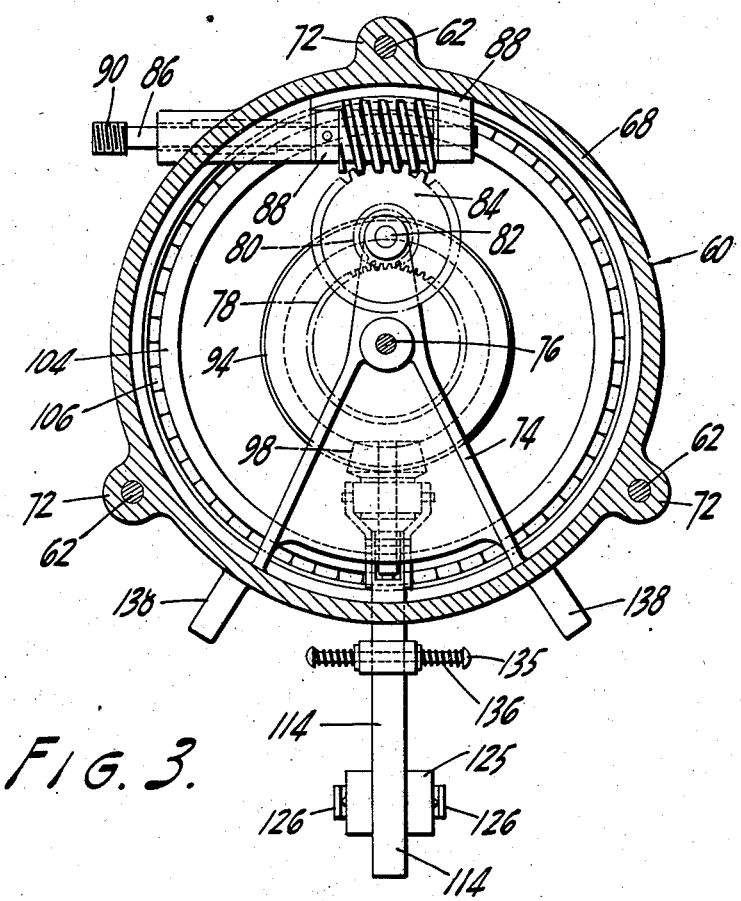
Fig. 3 is a transverse section, as along line III—III of Fig. 2.

The motor speed index drive devices 30—34—36—38 and the power supply conductors leading to the pitch control motors are operably coupled to the synchronizer mechanism which is contained within a housing 60. As illustrated in Figs. 2 and 3, the housing 60 is generally of cylindrical form and comprises a series of housing segments arranged in side-by-side relation and united in rigid assembly by means of tierods 62 spaced peripherally of the housing. Thus, the housing comprises a series of elements of which the opposite end members are in the form of end closure plates 64—66, and a series of alternately disposed ring members 68—69 arranged therebetween. Each ring member 69 is peripherally flanged as at 70 so as to be adapted to slide fit into abutting telescopic relation with respect to the adjacent ring member 68; and at the left hand end of the housing 60 the last ring member 69 fits against the end plate 64. The end plate and ring elements are all provided with radially extending eye portions 72 (Fig. 3) through which the tierods 62 are threaded, whereby upon assembly of the housing elements an accurately centered and rigid housing unit is provided.

Each ring member 69 is provided with an interiorly transverse bracket portion 74 extending from the lower portion thereof in A frame fashion so as to encompass the longitudinal center line of the housing structure. The brackets 74 are each formed with bearing block portions 75 which are aligned concentrically of the longitudinal axis of the housing 60 for rotatably supporting thereon corresponding shafts 76. In the case of the present drawings there are four of the ring elements 69, and four correspondingly mounted shafts 76. Each of the shafts 76 carries a spur gear 78 at an extending end portion thereof, and the gears 78 are arranged to mesh with corresponding pinions 80 which are carried by corresponding counter shafts 82.

Each counter shaft 82 is rotatably mounted upon another bearing block portion 83 of the corresponding bracket 74, and carries at its opposite end a worm wheel 84. A worm gear 85 is arranged to mesh with each corresponding worm wheel 84 and is carried by a stub shaft 86 which is in turn rotatably mounted upon split bearing portions 88 extending downwardly from the corresponding ring portions 68—69 as viewed in Figs. 2 and 3. Thus, the housing 60 is arranged to mount four similar gear units in parallel; each gear unit including a shaft 76, spur gears 78—80, and worm gears 84—86. One of the intermediately disposed worm gear members is operatively coupled to the index drive device 30, as by means of a screw connection with the extending end portion of the worm shaft 86, as indicated at 90 (Fig. 3). Similarly, the worm gear shaft members of the gear units to the left of the first mentioned gear unit (Fig. 2) are operatively coupled to the corresponding speed index drive devices 34—36 leading from the engine units 10—12, and the worm drive shaft of the gear unit at the right hand end of the housing 60 is likewise coupled to the speed index drive cable leading from the engine unit 16.

The shaft 76 controlled by the index cable 30 of the synchronizing mechanism is provided at its opposite end portions with oppositely disposed bevel gears 91—92, and the shaft members 76—76 disposed at opposite end portions of the housing are provided with similar bevel gears 93—94 so disposed as to face corresponding of the bevel gears 91—92 in opposed spaced relation to provide paired differential gear units. Similarly paired gears 95—96 are provided on the shafts 76—76 at the left end of the housing, and differential pinion gears 97—98—99 are rotatably mounted upon corresponding shafts 100 so as to be normally disposed in mesh with the corresponding opposed bevel gear units 92—94 and 91—93 and 95—96. The shafts 100 are mounted rigidly upon corresponding mounting plates 102 so as to extend inwardly therefrom. The plates 102 are attached to the inner race portions 104 of corresponding ball bearing units 106 which are arranged peripherally of the housing 60 to fit against the interior wall thereof. As indicated at 108 (Fig. 2), the ring members 68 are shouldered to cooperate with adjacent flange portions 70 of the ring members 69 so as to provide therebetween annular recesses for accommodating the races of the ball bearing devices 106 in clamped relation interiorly of the housing 60 so as to be positively fixed against movement longitudinally of the housing when in finally assembled form.

The speed index drive device 30 of the engine 14 and the index devices 34—36—38 of the engines 10—12—16 are so arranged that in response to blade pitch adjustments of the propellers in similar directions the bevel gear elements of each corresponding gear unit will be caused to rotate in counter directions and at proportionate speeds. Thus, for example, if the propellers of the units 18—19—20—21 are caused to move simultaneously in the same direction and at the same speed the corresponding bevel gear members 91—93 and 92—94 and 95—96 are thereby caused to rotate counterwise and at identical speeds so that the corresponding pinions 97—98—99 are simply rotated about the axes of their mounting shafts 100—100. However, in the event that one of the propellers is not moving at an identical speed with respect to the propeller of the master unit 14, the difference in speeds will be translated into movement of the corresponding pinion gear in either direction about the axis of the bevel gears, depending upon the character of the differential action. Thus, due to the mountings of the differential pinion gears upon the bearing races 104—104, the pinion gear reflecting differential movement of its corresponding differential gear unit will be caused to rotate peripherally of the housing 60.

Each of the mounting plates 102 is formed with a laterally extending bracket portion 110 which mounts, by means of a pivotal connection 112, a bell crank 114. The inner end of each bell crank 114 is yoke shaped to encompass the shank portion of the corresponding pinion gear 97—98—99, and to operatively connect therewith by means of a slot and pin connection as indicated at 116 in the manner of a clutch throwout device. For this purpose the pins may be carried by collars which are rotatably mounted upon the gear shanks; the collars being held against vertical displacements relative to the gears by suitable shoulder or flange portions extending from the gear shanks. The cranks 114 are slotted as shown to allow the cranks to pivot freely in lateral directions without interferences from the pins of the connection devices. The differential pinion gears 97—98—99 are slidably mounted upon their corresponding mounting shafts 100, and therefore any pivoting of the crank 114 in a counterclockwise direction as viewed in Fig. 2 about the axis of the pivotal connection 112, will cause the yoke end portion of the lever to draw the corresponding pinion gear away from engagement between its corresponding bevel gear set.

Figure 4:
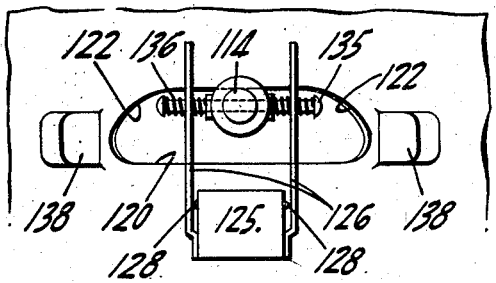
Fig. 4 is a fragmentary bottom plan of a propeller pitch change motor control and disconnect device portion of the mechanism of Figs. 2 and 3.

Each ring portion 69 of the housing 60 is provided with an opening as indicated at 120 to permit extension of the free arm of the corresponding bell crank 114 therethrough; and the perforated wall portions of the casing structure are elongated peripherally of the housing and slopingly shaped as indicated at 122 (Fig. 4) at each end of the opening to provide a lateral cam surface at each side of the normal central position of the corresponding bell crank 114, as illustrated by Figs. 2 to 4. A micrometer switch 125 is arranged adjacent each bell crank 114 at the extending end portion thereof (Figs. 2 and 4); and each micrometer switch includes a pair of oppositely disposed spring finger elements 126 arranged to straddle the corresponding bell crank 114 (Figs. 3-4). The fingers 126—126 are arranged to actuate contact devices 128—128 of the micrometer switch (Fig. 4) when pressed away therefrom, and thus it will be understood that in the case of any differential unit of the device whenever the corresponding bell crank 114 is caused to rotate axially of the housing 60 in view of differential operation of the corresponding bevel gear elements thereof, the bell crank 114 will move to displace either one of the finger members 126—126 away from its normal or unbiased position, depending upon the direction of movement of the bell crank 114 away from its normal centralized position. Thus, the micrometer switch will be actuated to close the circuit of the motor driving the corresponding propeller blade pitch change mechanism. Therefore it will be understood that upon assumption of pitch adjustment operation by the motor device as explained hereinabove, the angle of attack of the blades of the corresponding propeller will be so altered as to regulate the power output and speed of the corresponding engine toward conformity with the power output and speed of the other engine of the differential unit. The corresponding speed index drive device will thus be acting to drive the corresponding differential bevel gear and in this way the operation of engine unit 10 will be controlled by engine unit 12, and engine units 12 and 16 will be controlled by the master engine unit 14, whereby the power outputs and speeds of the master engine and the follower engines will be either directly or indirectly compared, and any relative lead or lag therebetween will be automatically compensated for by operation of the corresponding circuit controlling switches in such manner that all engines of the battery are immediately controlled so as to be brought into power output conformity.

Each of the cranks 114 carries a spring-pressed detent device 130 adapted to slidably engage either of two suitably recessed portions arranged in an arc concentrically of the corresponding pivot pin 112 in a side wall portion of the corresponding bracket 110, whereby the crank 114 is adapted to be releasably held at either of two radially extending positions relative to the bracket pin 112 so that the crank 114 will be disposed either in pinion-engaged or pinion-disengaged position. Thus, in event that the pitch adjustment mechanism of either the engines 10—12—16 becomes jammed or malfunctions for any other reason, any relative adjustments of the other units will be thereupon translated into differential movements between the bevel gears, such as will be directly translated into rotation of the corresponding differential pinion in directions peripherally of the housing 60. Thus, the corresponding crank 114 will be carried by the pinion to move against its detent device 130 away from normal mid position and through the slotted portion 120 of the housing against either one of the camming surfaces 122 thereof. By reason of this action the crank 114 will be thereby pivoted upon its connection 112 in such manner as to disengage the corresponding differential pinion from meshed relation with the corresponding bevel gears, and the crank 114 will be held by its detent device 130 in pinion-unmeshed position until subsequently adjusted manually. Thus, it will be understood that damaging disruption of the synchronizing mechanism will be avoided, and that upon subsequent repair of the pitch control mechanism the synchronizer unit is ready to be operatively reinstated by simple manual return of the crank 114 against the action of the detent device into normal or pinion meshed position.

A pin 135 is slidably inserted through a suitably apertured portion of each of the cranks 114—114 so as to extend at opposite sides thereof; and compression springs 136—136 are mounted under each headed end portion of the pins so that the pins are normally centered upon the corresponding lever arms but are adapted to be biased longitudinally in either direction relative thereto. A pair of opposed stop abutments 138 are arranged to extend below each ring member 69 at opposite ends of the lever accommodating openings 120 of the housing structure and to register with the pins 135 upon rotation of the corresponding crank arms 114 into throw-out position. Thus, it will be understood that during throw-out operations, as the crank 114—114 are cammed laterally of the housing apertures and the corresponding pinion is unmeshed, the spring devices 136 are adapted to kick the crank arms back toward normal centered positions relative to the housing 60, while the pinions remain in unmeshed condition. Thus, the crank arms return to switch-off positions, and are ready to be snapped sidewise, manually, into pinion-meshed position by a simple sidewise movement thereof.

Thus it will be understood that the synchronizer mechanism will operate as follows: When the propeller blade pitch changing mechanism of the master unit 14 is adjusted, as for example by manual or other operation of the control device 26, the speed of the motor 14 will be correspondingly either increased or decreased and the corresponding index drive cable will cause the corresponding differential bevel gears to rotate at a proportionately altered speed. This will cause the differential pinions which control the switches of the propeller pitch motors 19 and 21 to have planetary movements in the direction of rotation of the leading differential bevel gears, and thus the corresponding micrometer switches will be actuated so as to close the circuits of the engine-propeller adjustment motors at 19 and 21. Hence, these motors are instantaneously energized to change the pitch of their propeller blades so as to bring the engines 12 and 16 into operating speed conformity with engine 14. The engine unit 10 will thereupon be controlled automatically to become synchronized in similar manner with engine unit 12. Upon cessation of such arbitrarily imposed adjustments of the master engine, the corresponding adjustments of the follower engine devices are terminated immediately upon attainment of exactly equalized operational speed conditions, because of the corresponding release of the operating micrometer switch spring fingers due to retrograde operation of the differential gear systems. Obviously, if the adjustments of the follower engine mechanisms overrun corresponding adjustments of the lead unit, the corresponding drive control switch mechanisms will be actuated to reverse the pitch changing operations whereby overrunning or lagging of synchronization will be automatically damped out and engine unit 10 will again be controlled in the same manner to synchronize it with unit 12, and therefore to be synchronized indirectly with the master unit 14. Preferably, a manually operable connect-disconnect lever 140 will be coupled to all of the bell crank levers 114, as by means of linkage 142, whereby the automatic synchronizer mechanisms may be disconnected and reconnected at will by the aircraft pilot for individual control of the engines by means of conventional control devices.

It will be appreciated that the invention provides an improved synchronizing mechanism in conjunction with a multiple engine aircraft wherein speed adjustments of a master engine are accurately measured and compared in terms of mechanical motion transmitted to corresponding gear trains coupled to the follower engine units in such manner as to provide control of the follower units for exact synchronization thereof with the movements of the master element. Corresponding control of the follower engines is initiated automatically through operation of power controlled mechanisms, and such controlling of the follower engines is at all times directly compared to the operation of the master element in such manner as to provide for constant correction of any differential operation, whereby exact synchronization is provided.

Improved means for causing automatic disconnection of the synchronizer gear train of an inoperative pitch change unit are provided, whereby damage to the synchronizing mechanism is avoided in the event of malfunctioning of the pitch changing mechanisms. Also, at any stage of operation the synchronizing mechanism corresponding to either one or all of the following engines may be readily disconnected by simple manual manipulation of the corresponding differential pinion control lever or levers, in event it is desired to control the following engines independently of the synchronizing mechanism.

It will be appreciated that a particular feature and advantage of the mechanism of the invention is that by reason of the novel construction of the synchronizer mechanism housing and mounting of the differential gear parts thereon, the housing structure segments and the differential gear elements of the mechanisms may be simply duplicated any number of times and arranged in series for unitary assembly by means of suitably extended tierods so as to provide synchronizing mechanisms adapted to actuate any number of units. For example, if it is required to operate more than three follower units as illustrated and described hereinabove, additional housing segments and differential gear units will be added longitudinally of the machanism of the drawings at either or both ends thereof, and in such case adjacent of the differential gear mechanisms will interconnect to self-synchronize adjacent of such units and to relate the entire synchronizing operation back to the master control device. Thus, it will be understood that synchronizer mechanisms of the invention having various capacities may be manufactured in large quantity by simple part-duplicating processes, whereby important economies with respect to manufacturing cost and with respect to cost of repairs and servicing of such mechanisms may be realized.

It will be understod that in lieu of the electric motor and micrometer switch control mechanisms illustrated and described hereinabove, any other suitable power means may be employed for the purpose, such as hydraulic pressure mechanisms or the like; and that although only one form of the invention has been shown and described in detail, the invention is not so limited but that various changes may be made therein without departing from the spirit of the invention or the scope of the appended claims.

I claim:

1. In an aircraft, a plurality of separate engine-propeller units, propeller blade pitch changing means associated with each of said units, a manual control member associated with one of said pitch changing means, motor means operably coupled with the other said pitch changing means for causing the latter to be adjusted, and pitch adjustment synchronizing means operably associated with the engine corresponding to the manually controlled pitch changing means and with each of the engines corresponding to said motor means for synchronizing the speeds of said engine-propeller units, said synchronizing means including a housing, a pair of differential gears rotatably carried by said housing and operatively coupled respectively to the engine devices of said engine-propeller units to provide an interconnecting differential gear system having gear elements arranged for rotation at speeds commensurate with the speeds of operation of said engine devices, a planetary frame rotatably carried by said housing and movable concentrically about said gears, differential pinion means movably carried upon said frame and normally engaging said differential gears, a bell crank mounted upon said planetary frame and pivotable relative thereto in directions transverse to the direction of displacement of said pinion means, means connecting said bell crank to said pinion means, and cam means carried by said housing and coacting with said bell crank for displacing said pinion means in directions radially of said frame incidental to planetary movements of said pinion, said frame and said bell crank unit; and motor control means actuated by said bell crank and arranged to cause said motor means to be energized to alter the pitch of the blades of the corresponding of said propeller units.

2. In an aircraft, a plurality of separate engine-propeller units, propeller blade pitch changing means associated with each of said units, a manual control member associated with one of said pitch changing means, motor means operably coupled with the other said pitch changing means for causing the latter to be adjusted, and pitch adjustment synchronizing means operably associated with the engine corresponding to the manually controlled pitch changing means and with each of the engines corresponding to said motor means for synchronizing the speeds of said engine-propeller units, said synchronizing means including a housing, a pair of differential gears rotatably carried by said housing and operatively coupled respectively to the engine devices of said engine-propeller units to provide an interconnecting differential gear system having gear elements arranged for rotation at speeds commensurate with the speeds of operation of said engine devices, a planetary frame rotatably carried by said housing and movable concentrically about said gears, differential pinion means movably carried upon said frame and normally engaging said differential gears and movable to a position of disengagement therefrom, a bell crank pivotally mounted upon said frame and having its laterally extending arm rotatably connected with said pinion means, the other arm of said bell crank extending radially through said housing, cam means carried by said housing and coacting with the radial arm of said bell crank for axially moving said pinion means to disengage it from said differential gears, and motor control means actuated by said bell crank and arranged to cause said motor means to be energized to alter the pitch of the blades of the corresponding of said propeller units.

3. In an aircraft, a plurality of separate engine-propeller units, propeller blade pitch changing means associated with each of said units, a manual control member associated with one of said pitch changing means, motor means operably coupled with the other said pitch changing means for causing the latter to be adjusted, and pitch adjustment synchronizing means operably associated with the engine corresponding to the manually controlled pitch changing means and with each of the engines corresponding to said motor means for synchronizing the speeds of said engine-propeller units, said synchronizing means including a housing, a pair of differential gears rotatably carried by said housing and operatively coupled respectively to the engine devices of said engine-propeller units to provide an interconnecting differential gear system having gear elements arranged for rotation at speeds commensurate with the speeds of operation of said engine devices, a planetary frame rotatably carried by said housing and movable concentrically about said gears, differential pinion means movably carried upon said frame and normally engaging said differential gears and movable to a position of disengagement therefrom, a bell crank pivotally mounted upon said frame and having its laterally extending arm rotatably connected with said pinion means, the other arm of said bell crank extending radially through a slot formed in said housing, cam means formed in said slot and engaging said other arm for axially moving said pinion means to disengage it from said differential gears, and motor control means actuated by said bell crank and arranged to cause said motor means to be energized to alter the pitch of the blades of the corresponding of said propeller units.

4. In an aircraft, a plurality of separate engine-propeller units, propeller blade pitch changing means associated with each of said units, a manual control member associated with one of said pitch changing means, motor means operably coupled with the other said pitch changing means for causing the latter to be adjusted, and pitch adjustment synchronizing means operably associated with the engine corresponding to the manually controlled pitch changing means and with each of the engines corresponding to said motor means for synchronizing the speeds of said engine-propeller units, said synchronizing means including a housing, a pair of differential gears rotatably carried by said housing and operatively coupled respectively to the engine devices of said engine-propeller units to provide an interconnecting differential gear system having gear elements arranged for rotation at speeds commensurate with the speeds of operation of said engine devices, a planetary frame rotatably carried by said housing and movable concentrically about said gears, differential pinion means movably carried upon said frame and normally engaging said differential gears and movable to a position of disengagement therefrom, a bell crank pivotally mounted upon said frame and having its laterally extending arm rotatably connected with said pinion means, the other arm of said bell crank extending radially through said housing, cam means carried by said housing and coacting with the radial arm of said bell crank for axially moving said pinion means to disengage it from said differential gears, detent means carried by said frame and said bell crank for retaining said pinion means in either of its positions, and motor control means actuated by said bell crank and arranged to cause said motor means to be energized to alter the pitch of the blades of the corresponding of said propeller units.

5. In an aircraft, a plurality of separate engine-propeller units, propeller blade pitch changing means associated with each of said units, a manual control member associated with one of said pitch changing means, motor means operably coupled with the other said pitch changing means for causing the latter to be adjusted, and pitch adjustment synchronizing means operably associated with the engine corresponding to the manually controlled pitch changing means and with each of the engines corresponding to said motor means for synchronizing the speeds of said engine-propeller units, said synchronizing means including a housing, a pair of differential gears rotatably carried by said housing and operatively coupled respectively to the engine devices of said engine-propeller units to provide an interconnecting differential gear system having gear elements arranged for rotation at speeds commensurate with the speeds of operation of said engine devices, a planetary frame rotatably carried by said housing and movable concentrically about said gears, a differential pinion movably carried by said frame and normally engaging said differential gears and movable to a position of disengagement therefrom, a bell crank pivotally mounted upon said frame and having its laterally extending arm rotatably connected with said pinion, the other arm of said crank extending radially through said housing, stationary cam means carried by said housing and coacting with said radial arm for moving said pinion axially to disengage it from said differential gears, and motor control means actuated by said bell crank and arranged to cause said motor means to be energized to alter the pitch of the blades of the corresponding of said propeller units.

6. In an aircraft, a plurality of separate engine-propeller units, propeller blade pitch changing means associated with each of said units, a manual control member associated with one of said pitch changing means, motor means operably coupled with the other said pitch changing means for causing the latter to be adjusted, and pitch adjustment synchronizing means operably associated with the engine corresponding to the manually controlled pitch changing means and with each of the engines corresponding to said motor means for synchronizing the speeds of said engine-propeller units, said synchronizing means including a housing, a pair of differential gears rotatably carried by said housing and operatively coupled respectively to the engine devices of said engine-propeller units to provide an interconnecting differential gear system having gear elements arranged for rotation at speeds commensurate with the speeds of operation of said engine devices, a planetary frame rotatably carried by said housing and movable concentrically about said gears, a differential pinion movably carried by said frame and normally engaging said differential gears and movable to a position of disengagement therefrom, a bell crank pivotally mounted upon said frame and having its laterally extending arm rotatably connected with said pinion, the other arm of said crank extending radially through said housing, stationary cam means carried by said housing and coacting with said radial arm for moving said pinion axially to disengage it from said differential gears, a spring pressed detent pin carried by the radial arm of said crank, spaced lugs carried by said housing and engageable with said pin when said radial arm is moved to its camming positions for urging said radial arm toward its neutral position, and motor control means actuated by said bell crank and arranged to cause said motor means to be energized to alter the pitch of the blades of the corresponding of said propeller units.

ROBERT J. WOODS.